(12) United States Patent
Wolterman (10) Patent No.: US 8,577,554 B2
(45) Date of Patent: Nov. 5, 2013

(54) NAVIGATION SYSTEM ACTIVATION OF A VEHICULAR DIRECTIONAL SIGNAL

(75) Inventor: Michael J. Wolterman, Brighton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 383 days.

(21) Appl. No.: 12/900,998

(22) Filed: Oct. 8, 2010

(65) Prior Publication Data

US 2012/0089300 A1 Apr. 12, 2012

(51) Int. Cl.
G01C 21/34 (2006.01)
B60Q 1/40 (2006.01)
B60Q 1/34 (2006.01)
B60Q 1/38 (2006.01)
G06F 17/40 (2006.01)

(52) U.S. Cl.
USPC .................. 701/45; 701/36; 701/48; 701/400

(58) Field of Classification Search
USPC ....................................... 701/36, 45, 48, 400
See application file for complete search history.

(56) References Cited

U.S. PATENT DOCUMENTS

| | | | |
|---|---|---|---|
| 5,839,086 A | 11/1998 | Hirano | |
| 2005/0187710 A1 | 8/2005 | Walker | |
| 2006/0271275 A1 | 11/2006 | Verma | |
| 2007/0010942 A1 | 1/2007 | Bill | |
| 2008/0082259 A1 | 4/2008 | Landschaft et al. | |
| 2009/0069977 A1 | 3/2009 | Markyvech | |
| 2009/0174540 A1* | 7/2009 | Smith | 340/465 |
| 2009/0189756 A1 | 7/2009 | Wu et al. | |
| 2010/0049437 A1 | 2/2010 | Hu et al. | |
| 2012/0271510 A1* | 10/2012 | Seymour et al. | 701/36 |

FOREIGN PATENT DOCUMENTS

| | | |
|---|---|---|
| JP | 2008-056232 | 3/2008 |
| KR | 98025855 | 7/1998 |
| KR | 2006089377 | 8/2006 |
| KR | 2007099931 | 10/2007 |

* cited by examiner

*Primary Examiner* — Khoi Tran
*Assistant Examiner* — Dale Moyer
(74) *Attorney, Agent, or Firm* — Snell & Wilmer LLP (57) ABSTRACT

Devices, methods and systems describe a turn signal activation system. As the navigation system determines that the vehicle is approaching a turn or other operation, the turn signal may be automatically activated in the appropriate direction (e.g., right-turn signal for a right turn, and a left-turn signal for a left turn). Once the navigation system determines that it is appropriate to deactivate the turn signal, the turn signal may be automatically deactivated. In this fashion, other drivers on the road may be able to anticipate the actions of the vehicle based on the activation and deactivation of the turn signals, and thereby prevent accidents from occurring.

12 Claims, 7 Drawing Sheets

NAVIGATION SYSTEM ACTIVATION OF A VEHICULAR DIRECTIONAL SIGNAL

BACKGROUND

1. Field

The present disclosure relates to navigation systems operating in conjunction with motor vehicles, and more particularly relates to methods, devices and systems for automatically activating and deactivating a motor vehicle turn signal.

2. Description of the Related Art

Over the last decade or so, navigation systems, and in particular, those based on a Global Positioning System (GPS), have become popular and extensively used in consumer vehicles and the like. A navigation system that allows a driver to focus on the road without having to look on paper maps while driving, helps prevent a driver from getting lost, and otherwise enhances the driving experience. In typical usage, the driver or another occupant inside the vehicle inputs the destination name or address via an interface (e.g., a LCD screen) on the navigation system. Once the address is ascertained, the navigation system quickly maps out the preferred route and provides instructions verbally or displays the instructions on a map on a screen, or both. As the driver begins driving the vehicle, the navigation system may provide turn-by-turn directions, verbally instructing the driver on which road to stay on, which exit to take, where to make a turn, and the like, thereby assisting the driver to more efficiently arrive at the desired destination. Should the driver not follow the instructions given, some navigation systems are now able to re-route the driver in real-time, providing an updated route and corresponding instructions.

While sophisticated, and certainly a welcome addition to vehicles, navigation systems are still not optimal. For example, consider the situation where a navigation system instructs the driver to exit a freeway at the next exit. Traveling at speeds of upwards of 70 miles per hour, and sometimes even beyond, the driver might not have much time to move the vehicle into position to make the exit, especially if the exit is on the right-hand side of the road and the vehicle is on the left-most lane of a four-lane freeway. In this situation, the driver may become frantic and may be focused on what is the quickest way to move over three lanes before the next upcoming exit. In such situations, the driver might not take all the precautions necessary to operate the vehicle safely without endangering himself or herself and others. For example, turn signals—formally called directional indicators or directional signals, and informally known as "directionals", "blinkers", "indicators" or "flashers"—are signal lights mounted near the left and right front and rear corners of a vehicle, and sometimes on the sides, are used to indicate to other drivers that the operator intends a lateral change of position (turn or lane change). However, since the driver is distracted and focused on shifting the vehicle over to make the exit, the driver may forget to use the turn signals to alert other drivers on the road that the driver is changing lanes or exiting, which in turn, may compromise the safety of passengers and may lead to a car accident. Additionally, in some jurisdictions, it is illegal to make a turn or change lanes without signaling. Even if the driver is able to avoid causing an accident, failure to activate the turn signals may lead to a traffic ticket.

Accordingly, devices, systems and methods are needed to improve upon current navigation systems.

SUMMARY

Devices, methods and systems are disclosed herein to describe a signal actuation system. In one embodiment, as the navigation system determines that the vehicle is approaching a turn or other operation which may find it beneficial to signal to other drivers via the turn signals (e.g., lane change, u-turn, and the like) the turn signal may be automatically actuated in the appropriate direction. Once the navigation system determines that it is appropriate to deactivate the turn signal, the turn signal may be automatically deactivated. In this fashion, other drivers on the road may be able to anticipate the actions of the vehicle based on the activation and deactivation of the turn signals, and in turn, accidents may be prevented.

In one embodiment, a navigation system is hardwired to the vehicle control system. In one example, a vehicle, especially those of a newer make and model year, may include an original equipment manufacturer (OEM) navigation system. These navigation systems are integrated into the vehicle (e.g., permanently or semi-permanently attached to the central console area and might not be removable for portable use).

In another embodiment, a navigation system includes a data transmission wire, such as a universal serial bus (USB) for coupling the navigation system to the vehicle control system. The navigation system in this embodiment may be a third-party navigation system and may be portable (e.g., easily attachable or removable each time the driver enters and operates the vehicle).

In another embodiment, a navigation system includes a wireless transmitter for communication with a vehicle control system. For example, the navigation system and the vehicle control system may communicate with each other via BLUETOOTH. The navigation system in this embodiment may be a third-party navigation system and may be portable (e.g., easily attachable or removable each time the driver enters and operates the vehicle).

In another embodiment, a navigation system includes a wireless transceiver for communication with other wireless transceivers (e.g., a BLUETOOTH transceiver). However, if the vehicle does not have a wireless transceiver but has a physical interface for receiving an external input (e.g., a USB port), a physical drive with BLUETOOTH and physical connection capabilities (e.g., a USB adapter) may be used, among other functions, as an intermediary to transmit data between the navigation system and the vehicle. The navigation system and the physical drive in this embodiment may be third-party systems and may be portable (e.g., easily attachable or removable each time the driver enters and operates the vehicle).

In another embodiment, the physical devices and systems described herein may perform methods that may include determining if the vehicle is approaching a turn, and if so, determining if the turn signal is activated. If the turn signal is not activated, the driver is alerted to activate the turn signal. If the driver fails to active the turn signal, and the vehicle is still approaching the turn, the appropriate turn signal may be activated (e.g., right blinker may be activated for a right-hand turn and the left blinker may be activated for a left-hand turn). The turn signal may be kept activated until the vehicle has been determined by the navigation system to have completed the turn or is otherwise past the location where the turn was to take place. The turn signal may then be deactivated or turned off until the next time the navigation system determines that the vehicle is approaching another turn.

In yet another embodiment, the physical devices and systems described herein may perform methods that include detecting that a turn signal has been activated, preventing the turn signal from being deactivated until the turn has been completed or the vehicle is past the intersection even if the steering wheel operation would normally have deactivated the turn signal. For example, a driver may activate a turn signal and intend for the turn signal to stay active as the driver moves from a left-most lane to a right-most lane and subsequently exits a freeway (especially when the freeway has 4 or more lanes). However, some vehicles automatically deactivates the turn signal based on steering wheel operation (e.g., moving over one lane and then proceeding straight may cause the turn signal to automatically deactivate and require the driver to reactivate the turn signal if he or she desires) causing inefficiency and possibly encouraging the driver to forego using the turn signal altogether since the driver knows he or she will have to continuously activate the turn signal multiple times as the driver moves from the left-most lane. By using the navigation system to determine the location of the vehicle, the automatic deactivation of the turn signal may be prevented, allowing the driver to continuously signal to other drivers that he/she desires to continue to move lanes and/or turn or exit off a road thereby promoting safety. In one aspect, other features described herein may be modified to incorporate these features.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
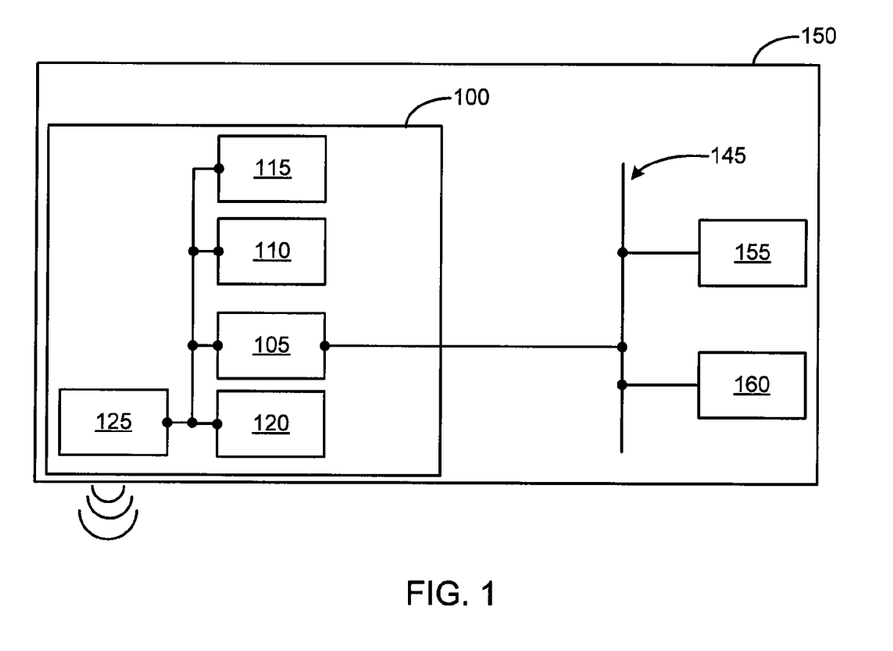
FIG. 1 depicts a navigation system in communication with a vehicle according to one or more embodiments described herein.

Turning to FIG. 1, a navigation system 100 as depicted may be connected to the control system of the vehicle 150. In one example, the control system of the vehicle 150 includes a Controller Area Network (CAN) bus 145. The CAN bus 145 is a vehicle bus standard designed to allow microcontrollers and devices to communicate with each other within a vehicle. A modern automobile may have as many as 70 electronic control units (ECU) for various subsystems. For example, ECUs may be used for controlling the turn signals, in addition to other vehicle systems such as the transmission, airbags, antilock braking, cruise control, audio systems, windows, doors, mirror adjustment, etc. More particularly, the CAN bus 145 is a multi-master broadcast serial bus standard for connecting these ECUs.

In this embodiment, the navigation system 100 may be an integrated, OEM navigation system installed at, for example, the front central console area of the vehicle between the driver and front passenger seat. However, the actual location of the navigation system 100 may be anywhere inside the vehicle. For example, the navigation system 100 may be integrated into the instrument display panel behind the steering wheel or dropped down from the ceiling area of the vehicle. The navigation system 100 may include a processor 105, an input-output interface 110, a route-determination unit 115, a memory 120 and a transceiver 125. For simplicity, the navigation system 100 may be considered one such ECU connected to the CAN bus 145, and may communicate with other ECUs via the CAN bus 145.

The input-output interface 110 may be, for example, a LCD touch screen input that a user may press to input commands and destination addresses into the navigation system 100. In one aspect of the operation of the navigation system 100, the processor 105 may receive a destination address from the I/O interface 110 and may receive a current location from the transceiver 125 communicating with, for example, a GPS satellite to determine the exact location of the vehicle. Next, the processor 105 may obtain a map from memory 120 and may provide the current location, the destination and a map to the route calculation unit 115 for determination of the preferred route. Once the route is calculated, the processor 105 may provide the route information to the I/O interface 110 for display and/or verbal output to the driver. As the vehicle moves, the navigation system 100 may track the route and exact location of the vehicle in order to provide real-time turn-by-turn directions.

As shown in FIG. 1, the processor 105 may be coupled to the CAN bus 145 to communicate with any number of other ECUs, such as a turn signal control unit 155 or an engine control unit 160. In one embodiment, electrical control signals generated by the processor 105 may be directly sent to the turn signal control unit 155 to activate and deactivate the right or left turn signals on the vehicle. Alternatively, the electrical control signals generated by the processor 105 may be sent to a general control unit, such as the engine control unit 160, which in turn, processes the electrical control signals and sends a subsequent signal(s) to control the turn signal control unit 155 to activate and deactivate the right or left turn signals on the vehicle. In addition, the turn signal control unit 155 and/or the engine control unit 160 may send requested information to the navigation system 100 via the CAN bus 145.

Figure 2:
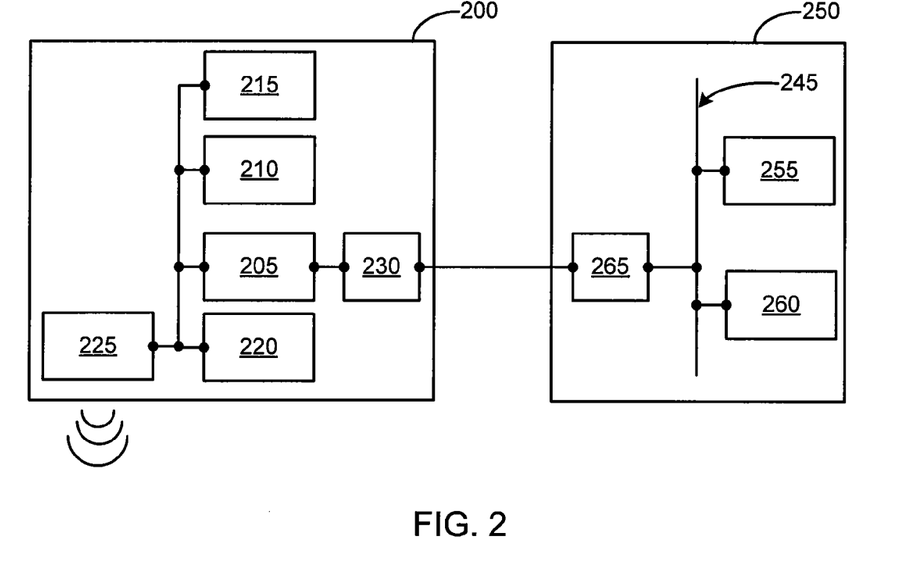
FIG. 2 depicts a navigation system in communication with a vehicle according to one or more embodiments described herein.

Turning to FIG. 2, a navigation system 200 as depicted may be connected to a control system 250 of a vehicle (not shown). In one example, the control system 250 may include a CAN bus 245. Here, in this embodiment, the navigation system 200 may be a portable, third-party navigation system usable by the driver inside or outside the vehicle. When utilized to provide turn-by-turn directions for the vehicle, the navigation system 200 may be, in one example, attached to the dash board or the inside of the windshield of the vehicle. The navigation system 200 may include a processor 205, an input-output interface 210, a route-determination unit 215, a memory 220 and a transceiver 225. The navigation system 200 may further include a port 230 for connecting the navigation system 200 to a port 265 of the control system 250 of the vehicle. The ports 230 and 265 may be, in one example, USB compliant and may be coupled to each other by using a USB cable. For simplicity, the navigation system 200 may be considered by the control system 250 of the vehicle as an ECU when connected to the CAN bus 245 via the USB port 265, and may communicate with other ECUs via the CAN bus 245. While the USB cable is described in this particular example, any known connection cable for transmitting and receiving data may be used such as a coaxial cable, a fire wire cable and the like.

The processor 205, the input-output interface 210, the route calculation unit 215, the memory 220 and the transceiver 225 of the navigation system 200 may operate in a similar fashion as the processor 105, the input-output interface 110, the route calculation unit 115, the memory 120 and the transceiver 125 of the navigation system 100. The main difference is the inclusion of the port 230 used to interface with the control system 250 of the vehicle.

Similarly, the CAN bus 245, the turn signal control unit 255 and the engine control unit 260 may operate generally like the CAN bus 145, the turn signal control unit 155 and the engine control unit 160 as described in correspondence with FIG. 1. The main difference is the inclusion of the port 265 used to interface with the navigation system 200. Notably, by allowing the navigation system 200 to communicate with the control system 250 of the vehicle, functionality is significantly enhanced. For example, older-generation navigation systems may now be retro-fitted for certain vehicles thereby allowing a driver to continue to use an older generation navigation system, which might not have been originally designed to provide such features.

Figure 3:
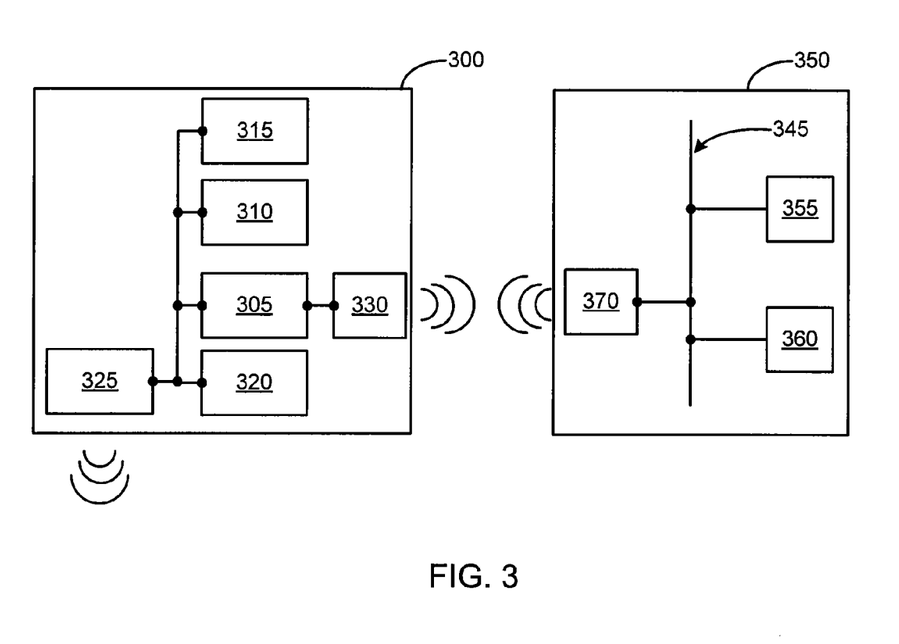
FIG. 3 depicts a navigation system in communication with a vehicle according to one or more embodiments described herein.

Turning to FIG. 3, a navigation system 300 as depicted may be connected to a control system 350 of a vehicle (not shown). In one example, the control system 350 of the vehicle includes a CAN bus 345. In this embodiment, the navigation system 300 may be a portable, third-party navigation system usable by the driver inside or outside the vehicle. When utilized to provide turn-by-turn directions for the vehicle, the navigation system 300 may be, in one example, attached to the dash board or the inside of the windshield of the vehicle. The navigation system 300 may include a processor 305, an input-output interface 310, a route-determination unit 315, a memory 320 and a transceiver 325. The navigation system 300 may further include a wireless communication adapter 330 for connecting the navigation system 300 to a wireless communication adapter 370 of a vehicle control system 350. The adapters 330 and 370 may be, in one example, BLUETOOTH-compliant and may be coupled to each other wirelessly as long as both devices are within communication range. For simplicity, the navigation system 300 may be considered by the vehicle control system 350 as an ECU when connected to the CAN bus 345 wirelessly via BLUETOOTH adapter 370, and may communicate with other ECUs via the CAN bus 345. While BLUETOOTH is described in this particular example, any known wireless transmission system for transmitting and receiving data may be used.

The processor 305, the input-output interface 310, the route calculation unit 315, the memory 320 and the transceiver 325 of the navigation system 300 may operate in a similar fashion as the processor 105, the input-output interface 110, the route calculation unit 115, the memory 120 and the transceiver 125 of the navigation system 100. The main difference is the inclusion of the wireless communication adapter 330 used to interface with the vehicle control system 350.

Similarly, the CAN bus 345, the turn signal control unit 355 and the engine control unit 360 may operate generally like the CAN bus 145, the turn signal control unit 155 and the engine control unit 160 as described in correspondence with FIG. 1. The main difference is the inclusion of the wireless communication adapter 370 used to interface with the navigation system 300. Notably, by allowing the navigation system 300 to communicate with the vehicle control system 350, functionality is significantly enhanced. For example, older-generation navigation systems may now be retrofitted for use in certain vehicles, thereby allowing a driver to continue to use an older generation navigation system which might not have been originally designed to provide such features. In addition, where the navigation system and the vehicle control system has both wired and wireless communication systems (e.g., USB and BLUETOOTH capabilities), a redundant system may be achieved and utilized such that the features described herein may be achievable even if one of the connections becomes lost (e.g., the USB cable becomes disconnected).

Figure 4:
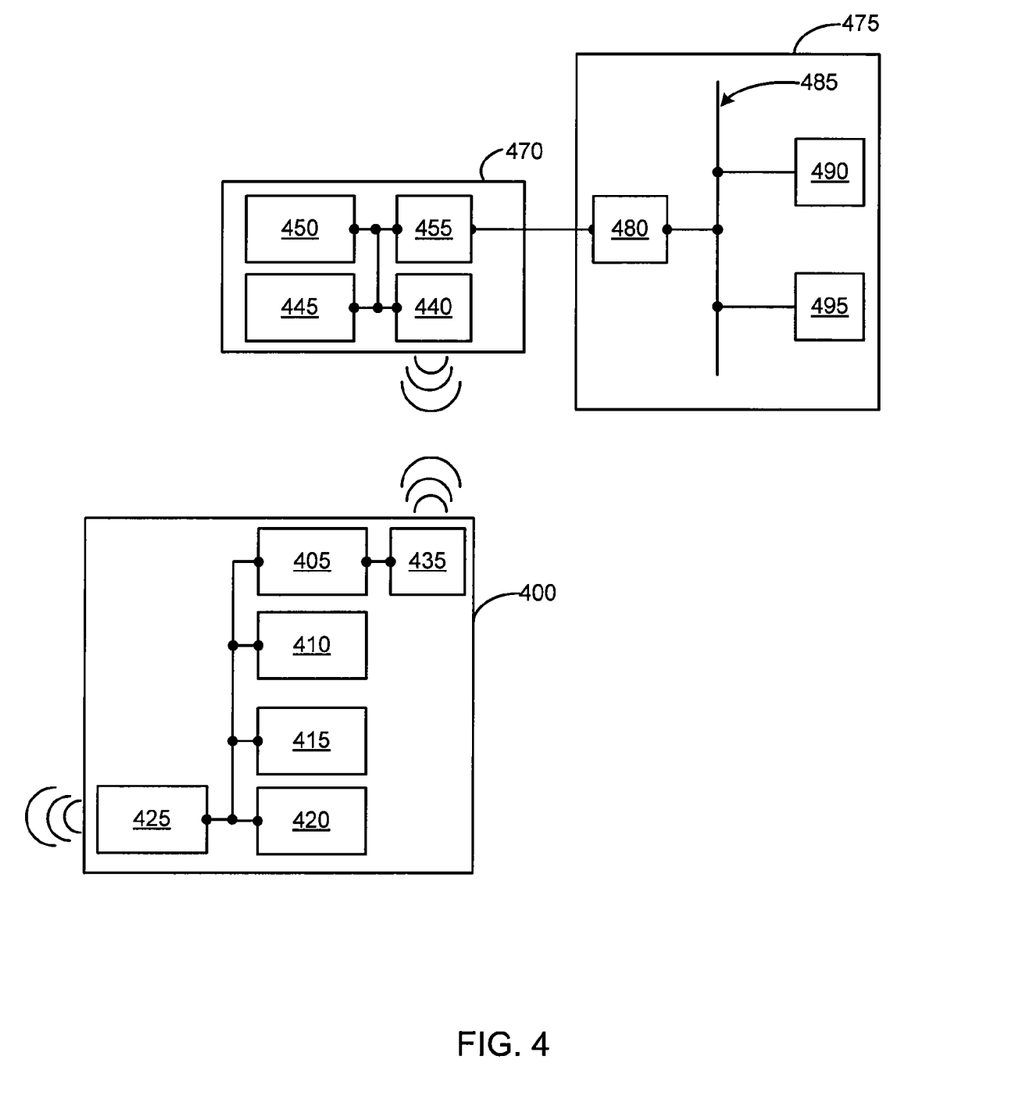
FIG. 4 depicts a navigation system in communication with a vehicle according to one or more embodiments described herein.

Turning to FIG. 4, a navigation system 400 as depicted may be configured to connect wirelessly to a physical drive 470, which in turn, may be connected to a control system 475 of a vehicle (not shown). In one example, the physical drive 470 may be a thumb drive or a flash drive. In this embodiment, the navigation system 400 may be a portable, third-party navigation system usable by the driver inside or outside the vehicle. When utilized to provide turn-by-turn directions for the vehicle, the navigation system 400 may be, in one example, attached to the dash board or the inside of the windshield of the vehicle. The navigation system 400 may include a processor 405, an input-output interface 410, a route-determination unit 415, a memory 420 and a transceiver 425. The navigation system 400 may further include a wireless communication adapter 435 coupled to the processor 405. In one embodiment, the wireless communication adapter 435 allows the navigation system 400 to communicate wirelessly with a wireless communication adapter 440 of the physical drive 470. The adapters 435 and 440 may be, in one example, BLUETOOTH-compliant and may be coupled to each other wirelessly as long as both devices are within communication range. In addition to the wireless communication adapter 440, the physical drive 470 may include a processor 445, a memory 450 and a wired connection interface port 455. As shown in FIG. 4, a vehicle control system 475 may include a wired connection interface port 480, a CAN bus 485, a turn signal control unit 490 and an engine control unit 495. The ports 455 and 480 may be, in one example, USB compliant and may be coupled to each other by using a USB cable.

For simplicity, the navigation system 400 may be viewed by the vehicle control system 475 as an ECU when in wireless communication with the physical drive 470 if the physical drive 470 is connected to the vehicle control system 475. In one embodiment, the navigation system 400 may communicate with the vehicle control system 475 via the physical drive 470. In other words, the physical drive 470 may function as a communication medium for transmitting data between the navigation system 400 and the vehicle control system 475. As discussed above, other communication mediums, both wired and wireless may be substituted for the BLUETOOTH and USB communication systems described.

The processor 405, the input-output interface 410, the route calculation unit 415, the memory 420 and the transceiver 425 of the navigation system 400 may operate in a similar fashion as the processor 105, the input-output interface 110, the route calculation unit 115, the memory 120 and the transceiver 125 of the navigation system 100. The main difference is the inclusion of the wireless communication adapter 435 used to interface with the physical drive 470.

Similarly, the CAN bus 485, the turn signal control unit 490 and the engine control unit 495 may operate generally like the CAN bus 145, the turn signal control unit 155 and the engine control unit 160, respectively, as described in correspondence with FIG. 1. The main difference is the inclusion of the port 480 used to interface with the physical drive 470. Notably, by allowing both the navigation system 400 and the vehicle control system 475 to communicate with the physical drive 470, functionality is significantly enhanced. For example, older-generation navigation systems may now be retro-fitted for certain vehicles thereby allowing a driver to continue to use an older generation navigation system, which might not have been originally designed to provide such features. Moreover, the older generation navigation system does not even need to be able to connect or communicate directly with the vehicle control system. Instead, these seemingly incompatible systems may now interface and communicate with one another via a physical drive such as a thumb drive.

Figure 6:
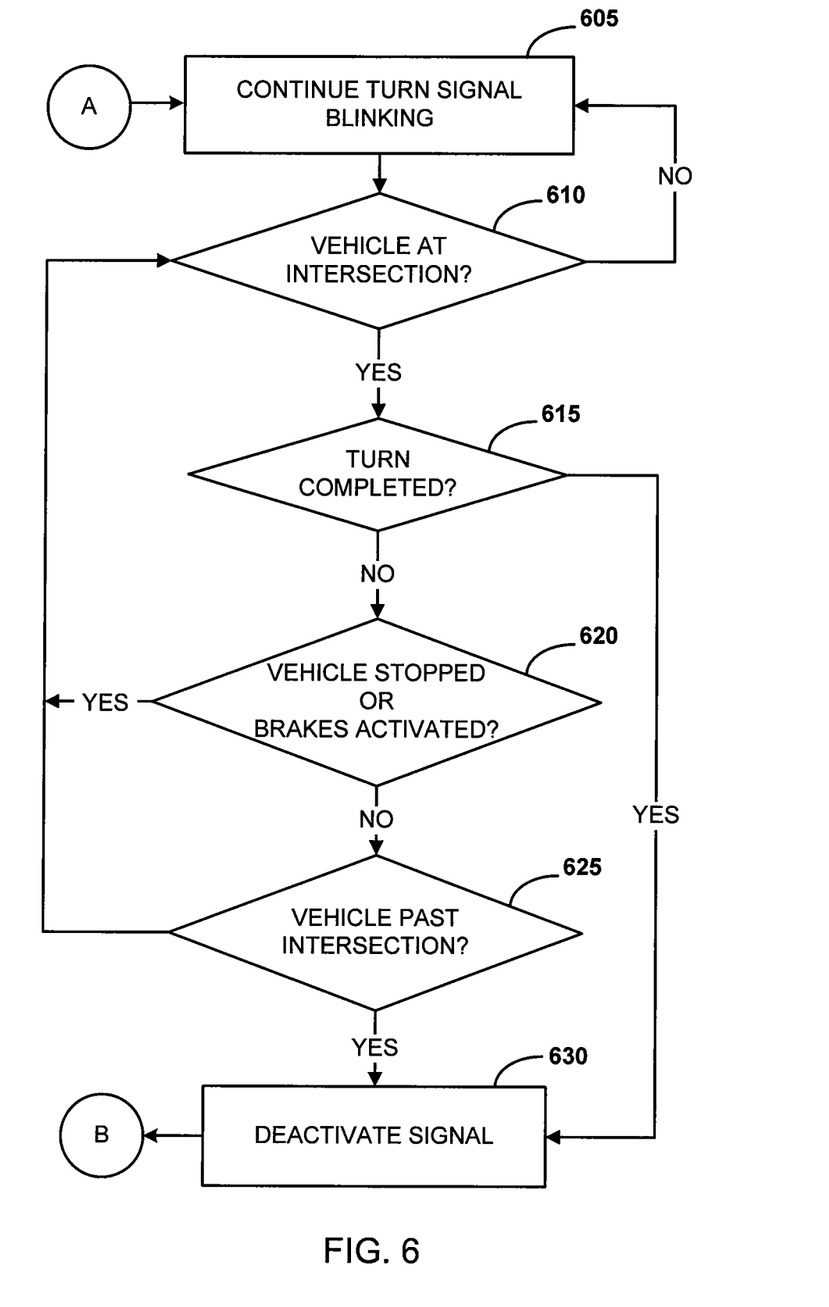
FIG. 6 illustrates an example of a flowchart describing the steps of a turn signal operation according to one or more embodiments described herein.
Figure 7:
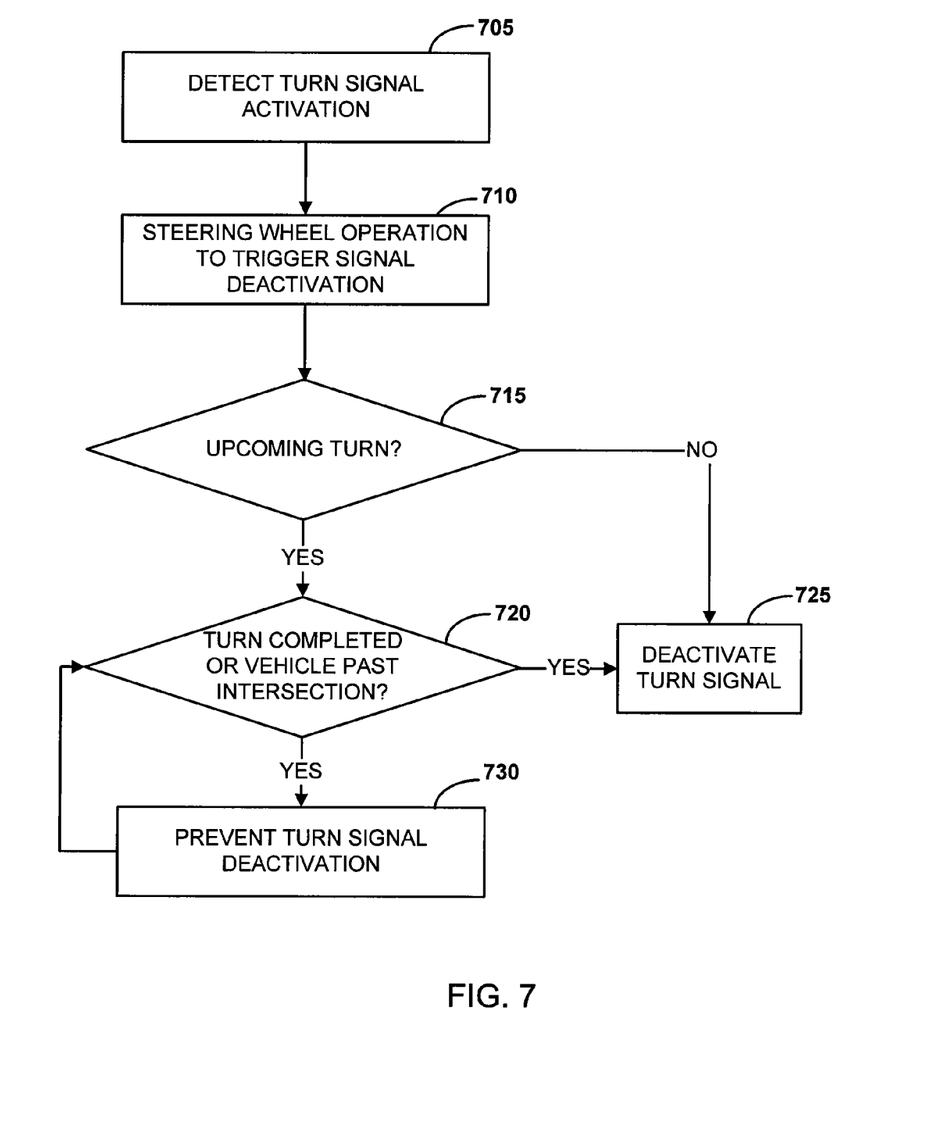
FIG. 7 illustrates an example of a flowchart describing the steps of a turn signal operation according to one or more embodiments described herein.

While the following descriptions will use the navigation system 200 of FIG. 2 as an example, any of the navigation systems disclosed herein may be configured to perform the methods described. In other words, any of the methods described herein (e.g., as shown in FIGS. 5-7) may be performed by any of the systems described herein (e.g., as shown in FIGS. 1-4).

Figure 5:
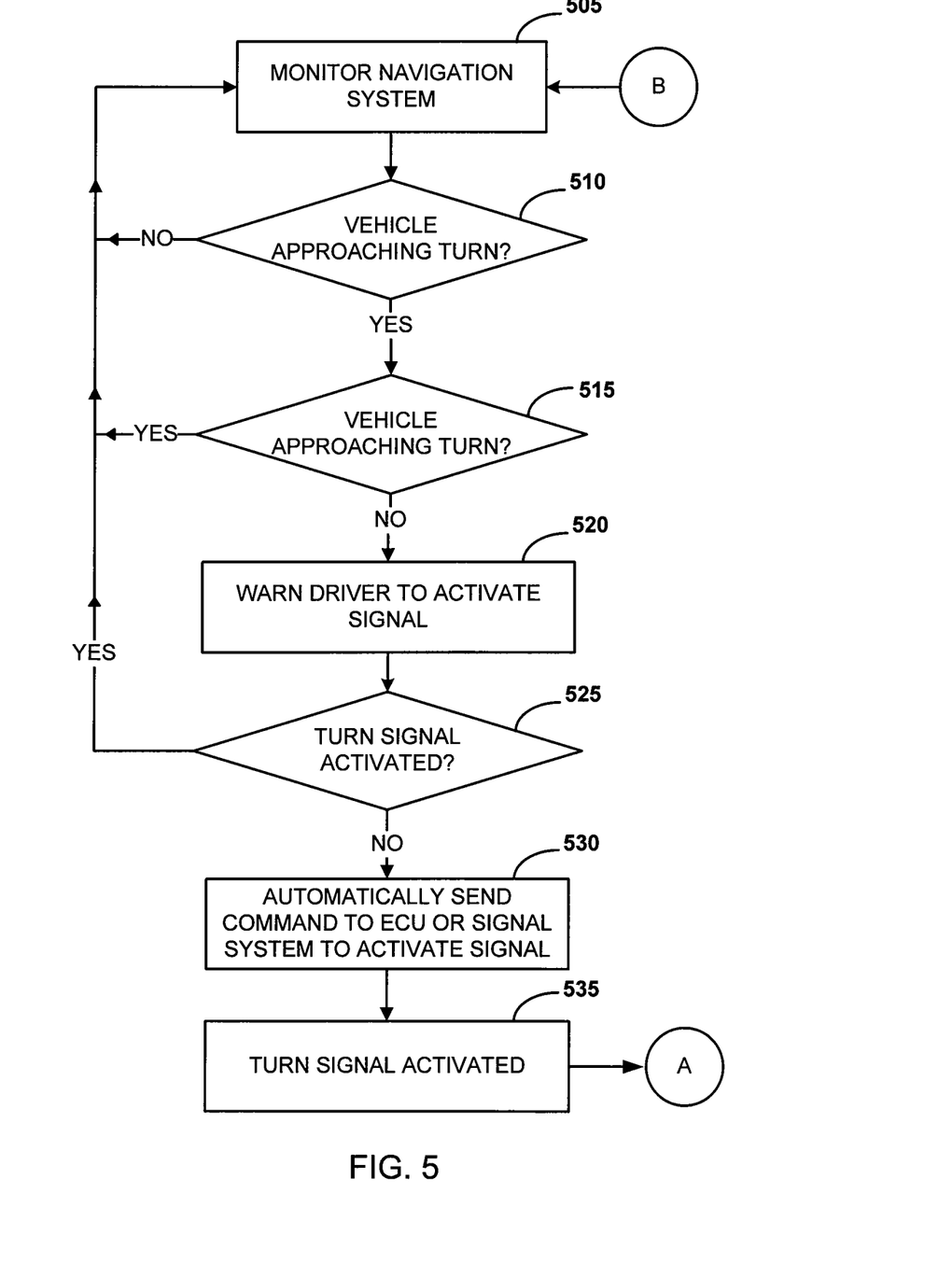
FIG. 5 illustrates an example of a flowchart describing the steps of a turn signal operation according to one or more embodiments described herein.

FIG. 5 is a flowchart illustrating one method of automatically activating a turn signal. At step 505, the processor 205 of the navigation system 200 may monitor the route and the current location of the vehicle by using the location information obtained by the transceiver 225 and the route information calculated by the route calculation unit 215. At step 510, the processor 205 determines if the vehicle is approaching a turn by using the location information obtained by the transceiver 225 and the route information calculated by the route calculation unit 215. For example, the processor 205 may determine if a change in direction (e.g., making a turn, exiting a highway, etc.) is next on the route guidance instructions, and if so, the processor 205 calculates if the vehicle is approaching a turn by calculating a travel speed of the vehicle, calculating a distance to the turn, and a time before the vehicle is anticipated to reach the turn based on the travel speed and the distance to the next turn by using the processor 205 to perform the calculations based on the location and route information obtained from the transceiver 225 and the route calculation unit 215. In one embodiment, if the time or distance to the next turn is estimated to be less than a pre-determined threshold (e.g., between about 5 to 10 seconds or less than 0.5 miles), the processor 205 determines that the vehicle is approaching a turn and the process moves to step 515 where the navigation system 200 (e.g., the processor 205) determines if the turn signal is activated. In one embodiment, the processor 205 of navigation system 200 may transmit a request to the vehicle control system 250 for information on whether the turn signal is already activated.

If the turn signal activation unit 255 returns data that indicates that the turn signal is not activated, then the process moves to step 520. Here, the navigation system 200 may play a recording (e.g., "activate turn signal") through speakers coupled to the navigation system 200 to verbally warn or alert the driver to activate the appropriate turn signal so that the other drivers may anticipate the travel path of the vehicle and accidents may be avoided. Alternatively, or in addition, the LCD screen of the navigation system may display an analogous message and/or flash like a blinker as an attempt to warn the driver. At step 525, after the passing of a predetermined amount of time (e.g., 2-4 seconds), the processor 205 of navigation system 200 may send a second request via the port 230 to the vehicle control system 250 to see if the turn signal is now activated after the warning or alert. If the driver still has not activated the turn signal, at step 530, the processor 205 may send a request (e.g., a start left or right signal) to the vehicle control system 250 to activate the appropriate turn signal at step 535. In one embodiment, the processor 205 may also control the navigation system 200 to play an audio message via the navigation system's speakers, display a message on the I/O screen, and/or flash a message on the I/O screen to inform the driver that the turn signal was activated for the vehicle. As shown in FIG. 5, if the vehicle is determined to not be approaching a turn at step 510 or if the correct turn signal was activated at steps 515 and 525, the process returns to step 505 where the processor 205 monitors the location of the vehicle and the next turn or change of direction by using the location information obtained by the transceiver 225 and the route information calculated by the route calculation unit 215.

In one embodiment, the processor 205 may skip the warning or alert and activate and/or deactivate the turn signal based on the location information and/or the route information. For example, the processor 205 may start the appropriate turn signal if the vehicle is within a predetermined time or distance from the actual turn without warning or alerting the driver. Also, the processor 205 may stop the appropriate turn signal a predetermined time or distance after the actual turn was taken or the actual turn was passed without warning or alerting the driver. For example, even if the actual turn was taken, the turn signal may still be blinking because the actual turn was a slight turn off the exit ramp, which does not trigger the steering wheel operation's automatic turn signal deactivator. However, the processor 205 determines based on the location information and/or route information that the actual turn was taken and automatically deactivates the turn signal after a predetermined time or distance after the actual turn.

If the turn signal was determined to be activated, but in the wrong direction (i.e., the right turn signal was activated when the next turn is a left turn) at steps 515 or 525, the navigation system 200 may alert or warn the driver with a different message at steps 520 and 530, respectively (e.g., verbally stating, "turn signal direction incorrect"). In another embodiment, the I/O screen of the navigation system 200 may display a message asking the driver whether the driver intends to have the blinker on in the opposite direction of and allow the driver to press one of two input buttons on the I/O screen. The first button may be a "change" button which may trigger the navigation system to send a command request to the vehicle control system 250 to change the direction of the turn signal. The second button may be a "don't change" button which may indicate that the driver is intentionally turning on the opposite blinker.

FIG. 6 is a flowchart illustrating one method of automatically deactivating a turn signal. At step 605, the turn signal may be blinking. At step 610, the processor 205 may determine whether the vehicle is at an intersection by using location information provided by the transceiver 225. If the result of step 610 is a determination that the vehicle is not at an intersection, the process returns to step 605, otherwise the process moves to step 615 and the processor 205 may determine whether the turn is completed at step 615 by using updated location information provided by the transceiver 225 and the route information calculated by the route determination unit 215. If the turn is completed, then the processor 205 may send a message to request the vehicle control system 250 to deactivate the turn signals (e.g., within 2-5 seconds and/or determining that the vehicle is at least 0.1 miles past the intersection). But, if the turn is not determined to be completed, the process moves to step 620 and the processor 205 may determine whether the vehicle is stopped based on the location information obtained from the transceiver 225 and/or the route determination unit 215 (or the navigation system 200 may request data from the vehicle control system 250 regarding whether the brakes are activated). If the vehicle is stopped, the process may return to step 610, otherwise the processor 205 may determine whether the vehicle is past the intersection by using the location information (e.g., determining that the vehicle is at least 0.1 miles past the intersection). If so, the processor 205 may send a message to request the vehicle control system 250 to deactivate the turn signals. In one embodiment, the processor 205 may also control the navigation system 200 to play an audio message via the navigation system's speakers, display a message on the I/O screen, and/or flash a message on the I/O screen to inform the driver that the turn signal was deactivated for the vehicle. However, if the processor 205 determines that the vehicle is not past the intersection at step 625, the process returns to step 610 and the processor 205 determines if the vehicle is at an intersection.

The methods of FIGS. 5 and 6 may be used in conjunction with one another as shown by circles A and B. Accordingly, the activation and deactivation system may be cycled through many times during each trip involving the navigation system and the vehicle.

FIG. 7 is a flowchart illustrating one method of overriding the steering wheel operation's automatic turn signal deactivation. At step 705, the processor 205 may receive a signal from the vehicle control system that a turn signal has been activated. At step 710, the driver's operation of the steering wheel triggers turn signal deactivation. For example, if the right-turn blinker is activated at step 705, and the driver moves over one lane to the right without making a turn yet, the steering wheel operation may be configured to automatically deactivate the turn signal as the vehicle assumes that a turn is completed or the lane change is the ultimate goal. However, in a situation where the driver has to first move the vehicle over a few lanes and then make a turn in accordance with instructions received from the navigation system, the driver may desire to leave the blinker on and prevent the steering wheel operation from deactivating the blinker. As such, in step 715, the processor 205 may determine if a turn is coming up by using the current location information received from the transceiver 225 and the route information from the route determination unit 215. If a turn is coming up, then at step 720, the processor 205 may determine if the vehicle is past the intersection or if the turn is completed. If so, then the processor sends a message to the vehicle control system 250 to deactivate the turn signal at step 725 (e.g., within 2-5 seconds and/or determining that the vehicle is at least 0.1 miles past the intersection). Otherwise, the turn signal deactivation is prevented at step 730 until the turn is completed or the vehicle is past the intersection. The processor 205 may send a command message to prevent the turn signal activation unit 255 from deactivating the turn signal until the turn signal activation unit 255 receives another message to disregard or remove the prevention command. In one embodiment, the method of FIGS. 5 and 6 may be modified to incorporate the features of FIG. 7. In another embodiment, the driver physically actuating the turn signal may override the prevention command.

Certain steps described above as performed by the navigation system may be performed instead by the vehicle control system (e.g., the engine control unit 260 of FIG. 2). For example, with respect to FIG. 5, step 505, the engine control unit 260 may continuously request route information from the navigation system to monitor the route and the current location of the vehicle. At step 510, the engine control unit 260 may determine if the vehicle is approaching a turn by analyzing data or information received from the navigation system. For example, the engine control unit 260 may determine if a change in direction (e.g., making a turn, exiting a highway, etc.) is next on the route guidance instructions, and if so, further calculating if the vehicle is approaching a turn by calculating a travel speed of the vehicle, calculating a distance to the turn, and a time before the vehicle is anticipated to reach the turn based on a travel speed and distance to the next turn (e.g., in seconds). In one embodiment, if the time to the next turn is estimated to be less than a pre-determined threshold (e.g., between about 5 to 10 seconds or less than 0.5 miles), the engine control unit 260 may determine that the vehicle is approaching a turn and the process of FIG. 5 moves to step 515 where the engine control unit 260 may determine if the turn signal is activated by requesting data from the turn signal activating unit 255. If the engine control unit 260 determines that the turn signal is not activated, then the process moves to step 520. Here, the engine control unit 260 may utilize the speakers of the vehicle to verbally warn or alert the driver by playing a recording (e.g., "activate turn signal") to the driver to activate the appropriate turn signal so that the other drivers may anticipate the travel path of the vehicle and accidents may be avoided. Alternatively or in addition, the engine control unit 260 may send a request to the navigation system via port 265 to display on the LCD screen of the navigation system an analogous message and/or flash like a blinker as an attempt to warn the driver for a short time (e.g., 2-3 seconds). At step 525, after the passing of a predetermined amount of time (e.g., 2-4 seconds), the engine control unit 260 may send a second request to the turn signal activation unit 255 to see if the turn signal is now activated after the warning or alert. If the driver still has not activated the turn signal, at step 530, the engine control unit 260 may send a request to the turn signal activation unit 255 to activate the appropriate turn signal at step 535. In one embodiment, the engine control unit 260 may also request that the navigation system play an audio message, display a message, and/or flash a message to inform the driver that the turn signal was activated for the vehicle. As shown in FIG. 5, if the vehicle is determined to not be approaching a turn at step 510 or if the correct turn signal was activated at steps 515 and 525, the process returns to step 505 where the engine control unit 260 monitors the location of the vehicle and the next turn or change of direction.

In one embodiment, if the turn signal was determined to be activated, but in the wrong direction (e.g., the right turn signal was activated when the next turn is a left turn) at steps 515 or 525, the engine control unit 260 may warn the driver by sending a different message to be outputted via the vehicle speakers at steps 520 and 530, respectively (e.g., verbally stating, "turn signal direction incorrect"). In another embodiment, the I/O screen of the navigation system may receive a command from the engine control unit 260 to display a message asking the driver whether the driver intends to have the blinker on in the opposite direction of and allow the driver to press one of two input buttons on the I/O screen of the navigation system. The first button may be a "change" button which may trigger the navigation system to send a command request to the vehicle control system to change the direction of the turn signal. The second button may be a "don't change" button which may indicate that the driver is intentionally turning on the opposite blinker. The navigation system may then receive the input from the driver and pass the input data to the engine control unit 260. The engine control unit 260 may then operate the turn signal activation unit 255 according to the driver's desires.

In another embodiment, certain steps of FIG. 6 may be performed by the vehicle control system instead of the navigation system. At step 605, the turn signal may be blinking. At step 610, the engine control unit 260 may determine whether the vehicle is at an intersection by requesting information from the navigation system. If the result of step 610 is a determination that the vehicle is not an intersection, the process returns to step 605, otherwise the process moves to step 615 and the engine control unit 260 may determine whether the turn is completed at step 615 by again requesting location information from the navigation system. If the turn is completed, then the engine control unit 260 may send a message to the turn signal activation unit 255 to deactivate the turn signal if the turn signal has not yet been deactivated (e.g., within 2-5 seconds and/or determining that the vehicle is at least 0.1 miles past the intersection). In one embodiment, the engine control unit 260 may also request that the navigation system play an audio message, display a message, and/or flash a message to inform the driver that the turn signal was deactivated for the vehicle. But, if the turn is not determined to be completed, the process moves to step 620 and the engine control unit 260 determines whether the vehicle is stopped by, for example, determining whether the brakes are activated. If the vehicle is stopped, the process may return to step 610, otherwise the engine control unit 260 may determine whether the vehicle is past the intersection by requesting location information from the navigation system (e.g., determining that the vehicle is at least 0.1 miles past the intersection). If so, the engine control unit 260 may send a message to the turn signal activation unit 255 to deactivate the turn signal if the turn signal has not yet been deactivated. However, if the engine control unit 260 determines that the vehicle is not past the intersection based on location information navigation system at step 625, the process returns to step 610 and the engine control unit 260 determines if the vehicle is at an intersection.

In another embodiment, certain steps of FIG. 7 may be performed by the vehicle control system instead of the navigation system. In this example, at step 705, the engine control unit 260 determines that a turn signal has been activated. At step 710, the driver's operation of the steering wheel triggers turn signal deactivation. At step 715, the engine control unit 260 may request vehicle location information from the navigation system to determine if a turn is coming up. If so, then at step 720, the engine control unit 260 may request vehicle location information from the navigation system to determine if the vehicle is past the intersection or if the turn is completed. If so, the engine control unit 260 sends a command to the turn signal activation unit 255 to deactivate the turn signal at step 725 (e.g., within 2-5 seconds and/or determining that the vehicle is at least 0.1 miles past the intersection). Otherwise, the turn signal deactivation is prevented at step 730 until the turn is completed or the vehicle is past the intersection.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for wirelessly activating a turn signal of a vehicle using a portable navigation system, the method comprising:
   determining, using the portable navigation system, that the vehicle is approaching a turn;
   wirelessly transmitting a first request for information indicating whether the turn signal is activated, the first request being transmitted from the portable navigation system to a vehicle control system integrated into the vehicle;
   wirelessly receiving a first response from the vehicle control system indicating that the turn signal is not activated;

wirelessly transmitting a first command to automatically activate the turn signal, the first command being transmitted from the portable navigation system to the vehicle control system;

determining, using the portable navigation system, that the vehicle has completed the turn;

in response to determining that the vehicle has completed the turn, wirelessly transmitting a second request for information indicating whether the turn signal is deactivated, the second request being transmitted from the portable navigation system to the vehicle control system;

wirelessly receiving a second response from the vehicle control system indicating that the turn signal is not deactivated; and wirelessly transmitting a second command to automatically deactivate the turn signal, the second command being transmitted from the portable navigation system to the vehicle control system.

2. The method of claim 1, wherein the first request, the first response and the first command are each wireless, BLUETOOTH-compliant signals.

3. The method of claim 1, wherein the first request, the first response, the second request, the second response, the first command and the second command are each wireless, BLUETOOTH-compliant signals.

4. The method of claim 1, further comprising:
determining that a turning of a steering wheel of the vehicle effectuates a deactivation of an activated turn signal; and
preventing the turn signal from being deactivated by the turning of the steering wheel until after the portable navigation system determines that the turn is completed or that the vehicle is past an intersection of the turn.

5. The method of claim 1, further comprising:
providing a warning that the turn signal is not activated, wherein the warning includes an audio message played through a speaker of the portable navigation system.

6. The method of claim 5, wherein the warning further includes displaying a flashing message on a screen of the portable navigation system.

7. The method of claim 1, further comprising providing an indication that the turn signal was automatically activated for the vehicle by playing an audio message and flashing a message on a screen of the portable navigation system.

8. The method of claim 1, further comprising providing an indication that the turn signal was automatically deactivated for the vehicle by playing an audio message and flashing a message on a screen of the portable navigation system.

9. A system for determining turn-by-turn directions and activating a turn signal when a vehicle is scheduled to make a turn, the system comprising:
a navigation device including:
a processor configured to detect an upcoming turn based on a calculated travel route and a current location of the vehicle, generate a first request for information indicating whether the turn signal is activated in response to detecting that the upcoming turn is a predetermined distance away, receive a first response indicating that the turn signal is not activated and initiate a first command to automatically activate the turn signal, determine that the vehicle has completed the turn, generate a second request for information indicating whether the turn signal is deactivated, receive a second response indicating that the turn signal is not deactivated, and initiate a second command to automatically deactivate the turn signal, and a first wireless transceiver coupled to the processor, the first wireless transceiver configured to transmit the first request for information indicating whether the turn signal is activated, receive the first response indicating that the turn signal is not activated, transmit the first command to cause the activation of the turn signal, transmit the second request for information indicating whether the turn signal has been deactivated after the turn has been completed, receive the second response indicating that the turn signal has not been deactivated, and transmit the second command to cause the deactivation of the turn signal; and a vehicle control system including:
a turn-signal activation unit configured to activate and deactivate a turn-signal of the vehicle, and
a second wireless transceiver coupled to the turn signal activation unit, the second wireless transceiver configured to receive the first request for information indicating whether the turn signal is activated, transmit the first response indicating that the turn signal is not activated, receive the first command from the first wireless transceiver, transmit a signal causing the turn-signal activation unit to activate the turn signal, receive the second request for information indicating whether the turn signal has been deactivated after the turn has been completed, transmit the second response indicating that the turn signal has not been deactivated, and receive the second command to cause the deactivation of the turn signal.

10. The system of claim 9, wherein the processor is further configured to detect passing of an intersection of the turn, generate the second request for information indicating whether the turn signal has been deactivated, process the second response that the turn signal has not been deactivated, generate the second command in response to detecting the passing of an intersection of the turn, the first wireless transceiver is configured to transmit the second request for information indicating whether the turn signal has been deactivated, receive the second response that the turn signal has not been deactivated, transmit the second command to cause deactivation of a turn signal of the vehicle, and the second wireless transceiver is configured to receive the second request for information indicating whether the turn signal has been deactivated, transmit the second response that the turn signal has not been deactivated, receive the second command from the first wireless transceiver, process the second command, and transmit a signal causing the turn-signal actuation unit to deactivate the turn signal.

11. The system of claim 9, wherein the processor is further configured to generate an audio warning or a visual warning, as a reminder to activate the turn signal of the vehicle.

12. The system of claim 9, wherein the processor is further configured to generate an audio message or a visual message, to indicate that the turn signal was automatically activated.

* * * * *